(12) United States Patent
Shimoyama et al.

(10) Patent No.: US 10,040,319 B2
(45) Date of Patent: Aug. 7, 2018

(54) MOTORCYCLE TIRE

(71) Applicant: SUMITOMO RUBBER INDUSTRIES, LTD., Kobe-shi, Hyogo (JP)

(72) Inventors: Kimiaki Shimoyama, Kobe (JP); Yoshimasa Ueda, Kobe (JP)

(73) Assignee: SUMITOMO RUBBEER INDUSTRIES, LTD., Kobe-Shi, Hyogo (JP)

( * ) Notice: Subject to any disclaimer, the term of this patent is extended or adjusted under 35 U.S.C. 154(b) by 535 days.

(21) Appl. No.: 14/839,453

(22) Filed: Aug. 28, 2015

(65) Prior Publication Data

US 2016/0082777 A1 Mar. 24, 2016

(30) Foreign Application Priority Data

Sep. 19, 2014 (JP) .................................. 2014-191667

(51) Int. Cl.
*B60C 11/03* (2006.01)
*B60C 11/11* (2006.01)

(52) U.S. Cl.
CPC ........... *B60C 11/0304* (2013.01); *B60C 11/11* (2013.01); *B60C 11/03* (2013.01); *B60C 2011/0358* (2013.01); *B60C 2011/0367* (2013.01); *B60C 2011/0374* (2013.01); *B60C 2200/10* (2013.01)

(58) Field of Classification Search
CPC ............. B60C 2200/10; B60C 11/0311; B60C 11/1259; B60C 11/11; B60C 11/0304; B60C 11/03; B60C 2011/0358; B60C 2011/0367; B60C 2011/0374
USPC ...................................................... 152/209.11
See application file for complete search history.

(56) References Cited

FOREIGN PATENT DOCUMENTS

| JP | 2006076520 A | * | 3/2006 |
| JP | 2011-524837 A | | 9/2011 |
| WO | WO 2009/153821 A1 | | 12/2009 |

OTHER PUBLICATIONS

Machine translation of JP2006-076520 (no date).*

* cited by examiner

*Primary Examiner* — Steven D Maki
*Assistant Examiner* — Philip N Schwartz
(74) *Attorney, Agent, or Firm* — Birch, Stewart, Kolasch & Birch LLP

(57) ABSTRACT

A motorcycle tire is provided with a tread pattern made up of circumferentially alternately arranged first and second pattern units. The first pattern unit is substantially mirror symmetrical with the second pattern unit. Each pattern unit comprises a main oblique groove and first and second auxiliary oblique grooves, each of which is a bent groove having a bent position and composed of a steeply-inclined part and a mildly-inclined part, in the main oblique groove, the steeply-inclined part extends from a start position on one side of the tire equator to the bent position on the other side of the tire equator, while inclining to one tire circumferential direction; and the mildly-inclined part extends from the bent position to the adjacent tread edge, while inclining to the above-mentioned one tire circumferential direction.

13 Claims, 4 Drawing Sheets

MOTORCYCLE TIRE

BACKGROUND OF THE INVENTION

The present invention relates to a pneumatic tire for motorcycle, more particularly to a tread pattern capable of satisfying both of on-road performance and off-road performance at a highly sophisticated level and suitably used for an enduro motorcycle tire.

Japanese Patent Application Publication No. 2011-524837 discloses an enduro motorcycle tire for on-road and off-road. This tire have room for improvement in the on-road performance and off-road performance.

It is desirable for riding on-road to increase the ground contacting area of the ground contacting patch of the tire. On the other hand, it is desirable for riding off-road to sparsely arrange blocks or independent ground contacting elements. Thus, on-road performance and off-road performance are fundamentally antinomic.

If a tire provided with sparsely arranged blocks is used on-road, there is a possibility that, when starting to roll or lean the motorcycle in order to initiate cornering, a response to the rolling or leaning which the rider feels (hereinafter, the "rolling response") from the initial stage to final stage of the cornering becomes nonlinear, and the motorcycle is leant abruptly when the camber angle is increased over a certain value. Thus, the on-road handling stability or on-road performance is not good.

SUMMARY OF THE INVENTION

It is therefore, an object of the present invention to provide a motorcycle tire, in which both of on-road performance and off-road performance are satisfied at a highly sophisticated level.

According to the present invention, a motorcycle tire comprises:

a tread portion provided with a tread pattern made up of first pattern units and second pattern units alternately arranged in the tire circumferential direction, the first pattern unit being substantially mirror symmetrical with the second pattern unit, each of the first pattern units and the second pattern units comprising a main oblique groove, a first auxiliary oblique groove and a second auxiliary oblique groove, the main oblique groove composed of a steeply-inclined part and a mildly-inclined part with respect to the tire axial direction and formed as a bent groove having a bent position, wherein
the steeply-inclined part extends from a start position located on one side of the tire equator to the bent position located on the other side of the tire equator, while inclining to one tire circumferential direction, and
the mildly-inclined part extends from the bent position to the adjacent tread edge, while inclining to the above-mentioned one tire circumferential direction, and
a distance La between the start position and the adjacent tread edge is in a range of from 20% to 40% of a distance Lo between the tire equator and the tread edge, the first auxiliary oblique groove disposed on the above-mentioned one side of the tire equator and connected to the steeply-inclined part of the main oblique groove at a connection point, the first auxiliary oblique groove composed of a steeply-inclined part and a mildly-inclined part with respect to the tire axial direction and formed as a bent groove having a bent position, wherein
the steeply-inclined part extends from the connection point to the bent position, while inclining to the above-mentioned one tire circumferential direction, and
the mildly-inclined part extends from the bent position to the adjacent tread edge, while inclining to the above-mentioned one tire circumferential direction, the second auxiliary oblique groove connected to the steeply-inclined part of the main oblique groove at a connection point, the second auxiliary oblique groove composed of a steeply-inclined part and a mildly-inclined part with respect to the tire axial direction and formed as a bent groove having a bent position, wherein
the bent position is located on the same side of the tire equator as the bent position of the first auxiliary oblique groove,
the connection point is located on the other side of the tire equator than the bent position of the second auxiliary oblique groove,
the steeply-inclined part extends from the connection point to the bent position, while inclining to the above-mentioned one tire circumferential direction, and
the mildly-inclined part extends from the bent position to the adjacent tread edge, while inclining to the above-mentioned one tire circumferential direction.

Further, the motorcycle tire according to the present invention may have the following features:

(1) in each pattern unit, the first auxiliary oblique groove is substantially parallel with the second auxiliary oblique groove;

(2) the distance L1 from the bent position of the first auxiliary oblique groove to the adjacent tread edge is more than the distance L2 from the bent position of the second auxiliary oblique groove to the adjacent tread edge;

(3) each pattern unit comprises a first sub groove connecting between the first auxiliary oblique groove and the second auxiliary oblique groove, the depth of the first sub groove is smaller than the depth of the main oblique groove, and the first sub groove is inclined with respect to the tire axial direction to the same tire circumferential direction as the main oblique groove;

(4) each pattern unit comprises a second sub groove connecting between the second auxiliary oblique groove and the circumferentially adjacent main oblique groove of the next pattern unit, the depth of the second sub groove is smaller than the depth of the main oblique groove, and the second sub groove is inclined with respect to the tire axial direction to the same tire circumferential direction as the main oblique groove;

(5) each pattern unit comprises
a first sub groove connecting between the first auxiliary oblique groove and the second auxiliary oblique groove, and
a second sub groove connecting between the second auxiliary oblique groove and the circumferentially adjacent main oblique groove of the next pattern unit, the first sub groove and the second sub groove are inclined with respect to the tire axial direction to the same tire circumferential direction as the main oblique groove, and the depth of the first sub groove and the depth of the second sub groove are 40% to 60% of the depth of the main oblique groove;

(6) the angle θ1 of the first sub groove with respect to the tire circumferential direction is more than the angle θ2 of the second sub groove with respect to the tire circumferential direction.

In this application including specification and claims, excluding groove depths, various dimensions, positions and the like of the tire refer to those measured in a state such that the tread is developed to a flat form unless otherwise noted.

DESCRIPTION OF THE PREFERRED EMBODIMENT

An embodiment of the present invention will now be described in detail in conjunction with accompanying drawings.

Figure 1:
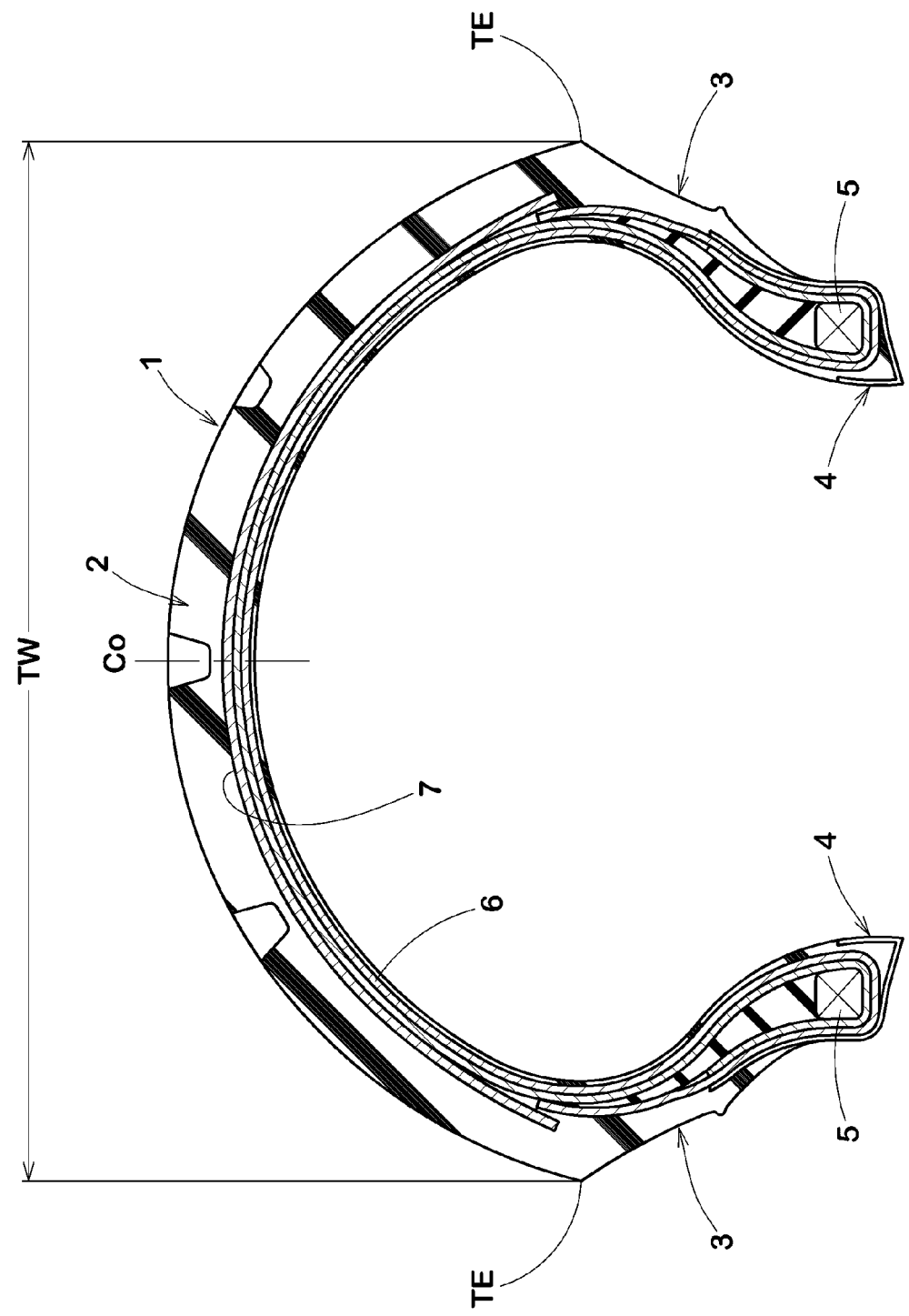
FIG. 1 is a cross sectional view of a motorcycle tire as an embodiment of the present invention.

As shown in FIG. 1, a motorcycle tire 1 according to the present invention is a pneumatic tire provided in the tread portion 2 with a block type tread pattern.

In this embodiment, the motorcycle tire 1 is designed for enduro motorcycles for running on-road as well as off-road.

The motorcycle tire 1 comprises the tread portion 2, a pair of bead portions 4 with a bead core therein, a pair of sidewall portions 3 extending therebetween, a carcass 6 extending between the bead portions 4 through the tread portion 2 and the sidewall portions 3 and secured to the bead cores 5, and a tread reinforcing layer 7 disposed radially outside the carcass 6 in the tread portion 2.

As a characteristic of a motorcycle tire, the tread portion 2 (inclusive of the carcass 6, tread reinforcing layer 7 and a tread rubber thereon) is convexly curved so that the tread face between the tread edges TE is curved like an arc swelling radially outwardly, and the maximum cross sectional width of the tire 1 occurs between the tread edges TE, namely, equals to the axial tread width TW.

Figure 2:
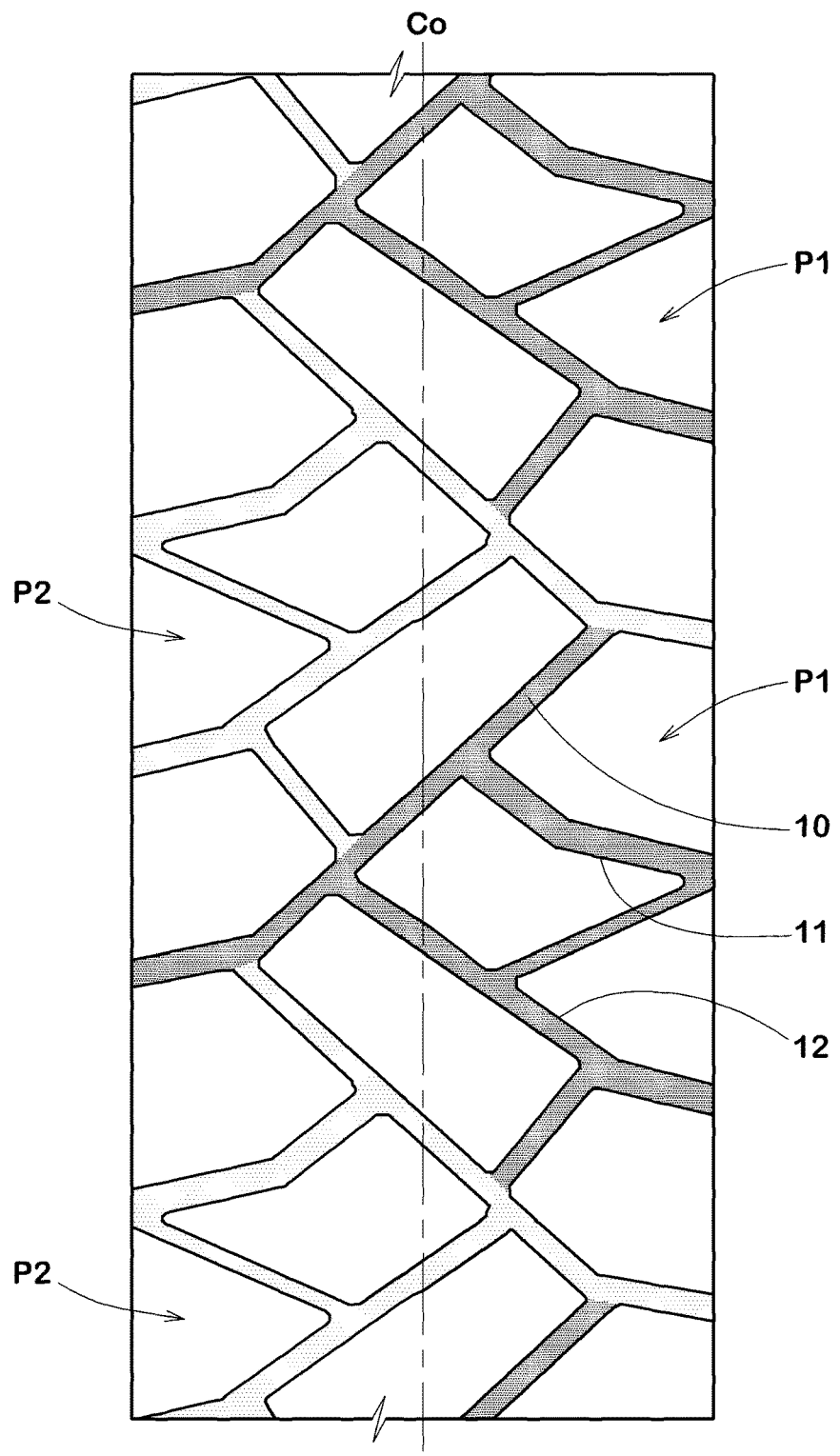
FIG. 2 is a developed view showing the tread pattern thereof.

The tread portion 2 is provided with a tread pattern composed of first pattern units P1 and second pattern units P2 which are alternately disposed in the tire circumferential direction as shown in FIG. 2.

In FIG. 2, the first pattern units P1 are filled with dark gray, and the second pattern units P2 are filled with light gray.

As shown, the second pattern unit P2 is substantially mirror symmetrical with the first pattern unit P1.

Therefore, the first pattern unit P1 is mainly described hereunder, but the description can be applied to the second pattern unit P2 by replacing "right" by "left" and "left" by "right".

Figure 3:
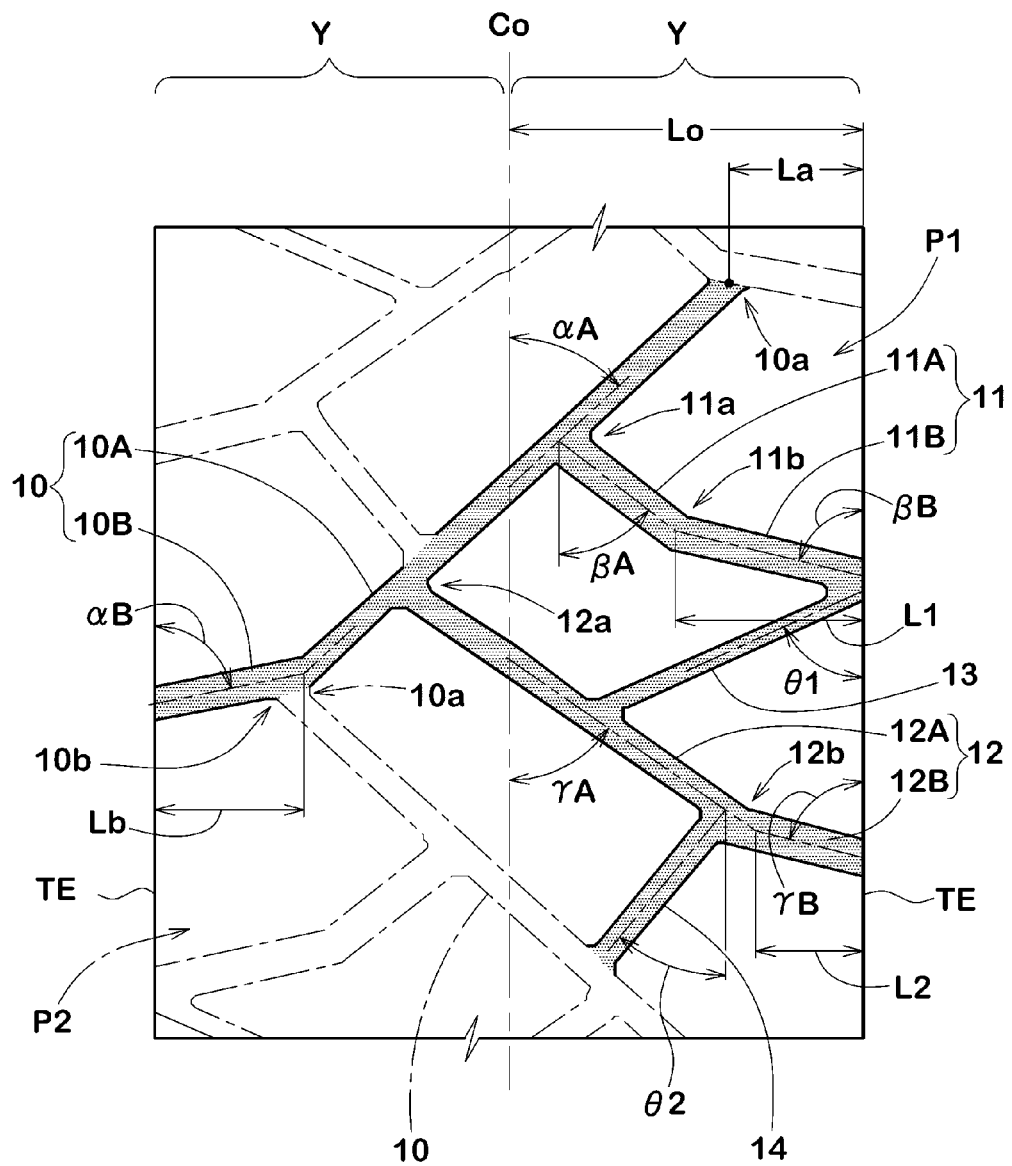
FIG. 3 is a developed view showing a pattern unit.

As shown in FIG. 3, the first pattern unit P1 comprises a main oblique groove 10, a first auxiliary oblique groove 11, and a second auxiliary oblique groove 12 which are inclined with respect to the tire axial direction.

In FIG. 3, the main oblique groove 10 inclined upward to the right, and the first and second auxiliary oblique grooves 11 and 12 are inclined downward to the right.

The main oblique groove 10 is composed of a steeply-inclined part 10A and a mildly-inclined part 10B, and formed as a bent groove having a bent position 10b.

The steeply-inclined part 10A extends from a start position 10a located in a right-hand half tread region Y on the right side of the tire equator Co to the above-mentioned bent position 10b located in a left-hand half tread region Y on the left side of the tire equator, while inclining to one tire circumferential direction (to the under side in FIGS. 2 and 3).

The mildly-inclined part 10B extends from the bent position 10b to the adjacent left-hand tread edge TE, while inclining to the same tire circumferential direction as the steeply-inclined part 10A at a smaller inclination angle with respect to the tire axial direction than that of the steeply-inclined part 10A.

Thus, the angle αA of the steeply-inclined part 10A with respect to the tire circumferential direction is less than the angle αB of the mildly-inclined part 10B with respect to the tire circumferential direction.

The angle αA is preferably set in a range of from 30 to 60 degrees. The angle αB is preferably set in a range of from 60 to 90 degrees. The angle difference (αB−αA) therebetween is preferably set in a range of from 15 to 50 degrees.

The distance La between the start position 10a and the adjacent right-hand tread edge TE is in a range of from 20% to 40% of the distance Lo between the tire equator co and the same right-hand tread edge TE.

In this example, the distance Lb between the bent position 10b and the adjacent left-hand tread edge TE is preferably in a range of from 20% to 40% of the distance Lo.

Especially, it is preferable that the distance La is equal to the distance Lb.

The first auxiliary oblique groove 11 is composed of a steeply-inclined part 11A and a mildly-inclined part 11B, and formed as a bent groove having a bent position 11b.

The steeply-inclined part 11A is disposed within the right-hand half tread region Y on the right side of the tire equator Co and connected to the steeply-inclined part 10A of the main oblique groove 10.

From the connection point 11a to the bent position 11b, the steeply-inclined part 11A extends, while inclining to the same tire circumferential direction as the main oblique groove 10 (to the under side in FIGS. 2 and 3).

The mildly-inclined part 11B extends from the bent position 11b to the adjacent right-hand tread edge TE, while inclining to the same tire circumferential direction as the steeply-inclined part 11A (to the under side in FIGS. 2 and 3) at a smaller inclination angle with respect to the tire axial direction than that of the steeply-inclined part 11A.

Thus, the angle βA of the steeply-inclined part 11A with respect to the tire circumferential direction is less than the angle βB of the mildly-inclined part 11B with respect to the tire circumferential direction.

The angle βA is preferably set in a range of from 40 to 70 degrees. The angle βB is preferably set in a range of from 60 to 90 degrees. The angle difference (αB−αA) therebetween is preferably set in a range of from 10 to 40 degrees.

The second auxiliary oblique groove 12 is composed of a steeply-inclined part 12A and a mildly-inclined part 12B and formed as a bent groove having a bent position 12b located in the right-hand half tread region Y on the right side of the tire equator Co.

The steeply-inclined part 12A is connected to the steeply-inclined part 10A of the main oblique groove 10 at a connection point 12a located in the left-hand half tread region Y on the left side of the tire equator.

From the connection point 12a to the bent position 12b, the steeply-inclined part 12A extends, while inclining to the same tire circumferential direction as the main oblique groove 10 (to the under side in FIGS. 2 and 3).

The mildly-inclined part 12B extends from the bent position 12b to the adjacent right-hand tread edge TE, while inclining to the same tire circumferential direction as the steeply-inclined part 12A (to the under side in FIGS. 2 and 3) at a smaller inclination angle with respect to the tire axial direction than that of the steeply-inclined part 12A.

Thus, the angle γA of the steeply-inclined part 12A with respect to the tire circumferential direction is less than the angle γB of the mildly-inclined part 12B with respect to the tire circumferential direction.

The angle γA is preferably set in a range of from 40 to 70 degrees. The angle γB is preferably set in a range of from 60 to 90 degrees. The angle difference (γB−γA) therebetween is preferably set in a range of from 10 to 40 degrees.

It is preferable that the first auxiliary oblique groove 11 is substantially parallel with the second auxiliary oblique groove 12.

Here, the "substantially parallel" means that
the difference |βA−γA| between the angle βA of the steeply-inclined part 11A of the first auxiliary oblique groove 11 and the angle γA of the steeply-inclined part 12A of the second auxiliary oblique groove 12 is not more than 5 degrees, and the difference |βB−γB| between the angle βB of the mildly-inclined part 11B of the first auxiliary oblique groove 11 and the angle γB of the mildly-inclined part 12B of the second auxiliary oblique groove 12 is not more than 5 degrees.

It is preferable that the distance L1 from the bent position 11b of the first auxiliary oblique groove 11 to the adjacent right-hand tread edge TE is more than
the distance L2 from the bent position 12b of the second auxiliary oblique groove 12 to the adjacent right-hand tread edge TE.

Especially, it is preferable that the distance L1 is more than the distance La, and the distance La is more than the distance L2.

The second pattern unit P2 is substantially a mirror image of the first pattern unit P1.

Here, the "substantially" means as follows.

In arranging the grooves (or pattern units) around the tire, it is possible to employ a variable pitching method as often used in other tire categories. In such case, there is a possibility that the first pattern units P1 have different circumferential dimensions, and the second pattern units P2 have different circumferential dimensions. Therefore, in a very strict sense, the second pattern unit P2 becomes not a mirror image of the first pattern unit P1. But, the present invention allows such discrepancies.

In this example, the main oblique grooves 10 of the first pattern units P1 are connected to the main oblique grooves 10 of the second pattern units P2 at the start positions 10a and the bent positions 10b. In other words, the start positions 10a substantially coincide with the respective bent positions 10b.

Such tread pattern is a block pattern and able to secure off-road performance.

In a tread crown region contacting with the ground during straight running, there are disposed the steeply-inclined parts 10A, 11A and 12A of the main oblique grooves 10 and the first and second auxiliary oblique grooves 11 and 12. Therefore, on-road straight running performance can be secured. It becomes easy to lean the motorcycle from the camber angle in the initial stage, namely, it is possible to quickly roll the motorcycle from the vertical position during straight running.

In a tread shoulder region contacting with the ground during cornering, there are disposed the mildly-inclined parts 10B, 11B and 12B of the main oblique grooves 10, and the first and second auxiliary oblique grooves 11 and 12. Therefore, the occurrence of the above-mentioned abrupt leaning of the motorcycle can be prevented. The rolling response becomes heavy. As a result, safety during cornering can be improved.

The positions of the connection points 11a and 12a of the first and second auxiliary oblique grooves 11 and 12 with the main oblique groove 10 are differed from each other in the tire circumferential direction and tire axial direction. Therefore, an abrupt change in the rolling response from the initial stage to the final stage of the cornering can be prevented, and the rolling response becomes linear. As a result, on-road handling stability or on-road performance can be improved.

In this embodiment, further, the positions of the bent positions 10b, 11b and 12b of the main oblique groove 10 and the first and second auxiliary oblique grooves 11 and 12 are differed from each other in the tire circumferential direction and tire axial direction. Therefore, the variation of the rolling response can be reduced, and the rolling response becomes more linear.

If the distance La of the start position 10a of the main oblique groove 10 is less than 20% of the distance Lo, there is a possibility that the motorcycle is leant abruptly when largely rolled or leant, and on-road performance is deteriorated.

If the distance La is more than 40% of the distance Lo, the rolling response tends to become nonlinear, and on-road performance is deteriorated. Further, mud self-ejecting performance when riding off-road or off-road performance is deteriorated.

In this embodiment, the first auxiliary oblique groove 11 and the second auxiliary oblique groove 12 are substantially parallel with each other. Therefore, the change in the tread pattern rigidity becomes linear. The abrupt change in the rolling response can be more effectively prevented. The rolling response becomes more linear.

In this embodiment, the first pattern unit P1 further comprises a first sub groove 13 connecting between the first auxiliary oblique groove 11 and the second auxiliary oblique groove 12.

Further, in this embodiment, the first pattern unit P1 comprises a second sub groove 14 connecting between the second auxiliary oblique groove 12 and the circumferentially adjacent main oblique groove 10 of the next second pattern unit P2.

Specifically, the first sub groove 13 in this example connects between the mildly-inclined part 11B of the first auxiliary oblique groove 11 and the steeply-inclined part 12A of the second auxiliary oblique groove 12.

The second sub groove 14 in this example connects between the steeply-inclined part 12A of the second auxiliary oblique groove 12 and the steeply-inclined part 10A of the main oblique groove 10.

The first and second sub grooves 13 and 14 are inclined to the same direction as the main oblique groove 10.

Figure 4:
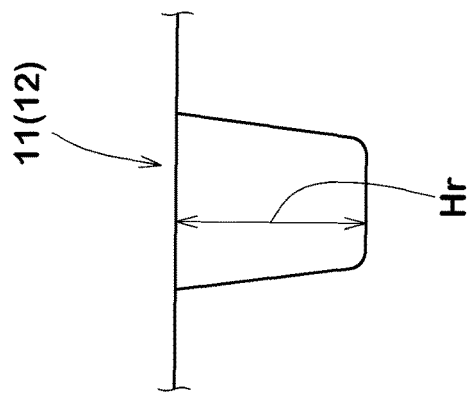
FIG. 4 shows schematic cross sections of a sub groove, main oblique groove and auxiliary oblique groove to comparatively show their depths.
Figure 4:
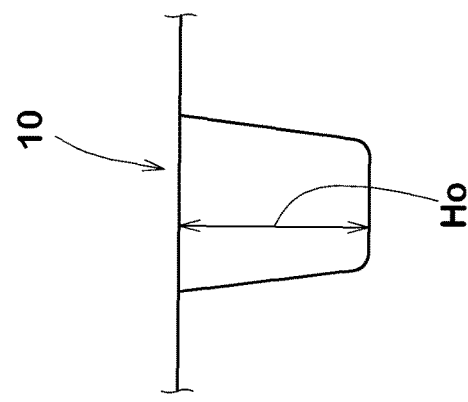
Figure 4:
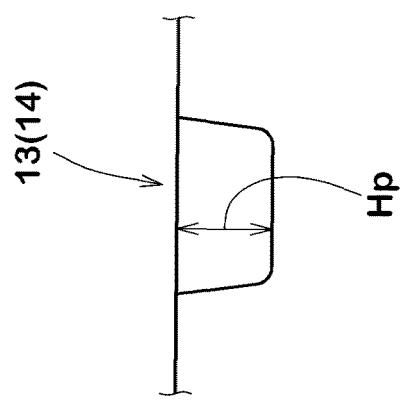

As shown in FIG. 4, the groove depth Hp of the first sub groove 13 and the groove depth Hp of the second sub groove 14 are less than the groove depth Ho of the main oblique groove 10. Preferably, the groove depths Hp are 40% to 60% of the groove depth Ho.

The groove depth Hr of the first auxiliary oblique groove 11 and the groove depth Hr of the second auxiliary oblique groove 12 are not more than the groove depth Ho and more than the groove depth Hp.

In this example, the groove depths Hr are equal to the groove depth Ho.

Such first and second sub grooves 13 and 14 enhance the edge effect of the block pattern, and off-road performance can be further improved.

Further, as the groove depth Hp is less than the groove depth Ho, the decrease in the pattern rigidity is prevented.

As a result, the prevention of the abrupt leaning and the improvement in the on-road performance are assured.

If the groove depth Hp becomes less than 40% of the groove depth Ho, the effect to improve off-road performance is reduced. If the groove depth Hp becomes more than 60% of the groove depth Ho, on-road performance is deteriorated.

Preferably, the angle θ1 of the first sub groove 13 with respect to the tire circumferential direction is more than the angle θ2 of the second sub groove 14 with respect to the tire circumferential direction.

While detailed description has been made of a preferable embodiment of the present invention, the specific embodiment should not be construed as to limit the scope of the present invention; the present invention may be embodied in various forms.

Comparison Tests

Based on the tread pattern shown in FIG. 2, motorcycle tires having the internal structure shown in FIG. 1 and specifications listed in Table 1 were experimentally manufactured and tested for on-road performance and off-road performance.

The test tires were mounted on the front wheel and rear wheel of a 1000 cc enduro motorcycle.

Front tire size: 90/90-21 (tire pressure 200 kPa)
Rear tire size: 150/70R18 (tire pressure 225 kPa)

The test was carried out on-road (paved road) and off-road (dirt course), and handling stability was evaluated by the test rider into ten ranks wherein the larger rank number is better.

Embodiment tires showed higher total points, and it was confirmed that the tires according to the present invention can satisfy both of the on-road performance and the off-road performance at a highly sophisticated level.

10a start position
10b bent position
11 first auxiliary oblique groove
11A steeply-inclined part
11B mildly-inclined part
11a connection point
11b bent position
12 second auxiliary oblique groove
12A steeply-inclined part
12B mildly-inclined part
12a connection point
12b bent position
13 first sub groove
14 second sub groove
Co tire equator
P1 first pattern unit
P2 second pattern unit
TE tread edge
Y half tread region

The invention claimed is:

1. A motorcycle tire comprising:
a tread portion provided with a tread pattern made up of first pattern units and second pattern units alternately arranged in the tire circumferential direction,
the first pattern unit being substantially mirror symmetrical with the second pattern unit,
each of the first pattern units and the second pattern units comprising a main oblique groove, a first auxiliary oblique groove and a second auxiliary oblique groove,
the main oblique groove composed of a steeply-inclined part and a mildly-inclined part with respect to the tire axial direction and formed as a bent groove having a bent position,
wherein
the steeply-inclined part extends from a start position located on one side of the tire equator to the bent position located on the other side of the tire equator, while inclining to one tire circumferential direction, and
the mildly-inclined part extends from the bent position to the adjacent tread edge, while inclining to said one tire circumferential direction, and
a distance La between the start position and the adjacent tread edge is in a range of from 20% to 40% of a distance Lo between the tire equator and the tread edge,

TABLE 1

| Tire | Ref. 1 | Ex. 1 | Ex. 2 | Ex. 3 | Ref. 2 | Ex. 4 | Ex. 5 | Ex. 6 | Ex. 7 | Ex. 8 | Ex. 9 | Ex. 10 |
|---|---|---|---|---|---|---|---|---|---|---|---|---|
| Main oblique groove distance La/distance Lo (%) | 10 | 20 | 30 | 40 | 50 | 30 | 30 | 30 | 30 | 30 | 30 | 30 |
| 1st & 2nd auxiliary oblique grooves | | | | | | | | | | | | |
| parallel or not | substantially parallel | substantially parallel | substantially parallel | substantially parallel | substantially parallel | not parallel | substantially parallel | substantially parallel | substantially parallel | substantially parallel | substantially parallel | substantially parallel |
| positional relationship between bent positions | L1 > L2 | L1 > L2 | L1 > L2 | L1 > L2 | L1 > L2 | L1 > L2 | L1 < L2 | L1 > L2 | L1 > L2 | L1 > L2 | L1 > L2 | L1 > L2 |
| 1st & 2nd second sub grooves | | | | | | | | | | | | |
| depth Hp/depth Ho (%) | 50 | 50 | 50 | 50 | 50 | 50 | 50 | 30 | 40 | 60 | 70 | 50 |
| angles θ1, θ2 | θ1 > θ2 | θ1 > θ2 | θ1 > θ2 | θ1 > θ2 | θ1 > θ2 | θ1 > θ2 | θ1 > θ2 | θ1 > θ2 | θ1 > θ2 | θ1 > θ2 | θ1 > θ2 | θ1 < θ2 |
| off-road performance | 10 | 10 | 10 | 8.5 | 7 | 10 | 9 | 8 | 9 | 9.5 | 9 | 8.5 |
| on-road performance | 4 | 7 | 10 | 8.5 | 7 | 7 | 7.5 | 9 | 9.5 | 8.5 | 7.5 | 8 |
| total point | 14 | 17 | 20 | 17 | 14 | 17 | 16.5 | 17 | 18.5 | 18 | 16.5 | 16.5 |

REFERENCE SIGNS LIST 1 motorcycle tire
2 tread portion
10 main oblique groove
10A steeply-inclined part
10B mildly-inclined part the first auxiliary oblique groove disposed on said one side of the tire equator and connected to the steeply-inclined part of the main oblique groove at a connection point, the first auxiliary oblique groove composed of a steeply-inclined part and a mildly-inclined part with respect to the tire axial direction and formed as a bent groove having a bent position, wherein the steeply-inclined part extends from the connection point to the bent position, while inclining to said one tire circumferential direction, and the mildly-inclined part extends from the bent position to the adjacent tread edge, while inclining to said one tire circumferential direction, the second auxiliary oblique groove connected to the steeply-inclined part of the main oblique groove at a connection point, the second auxiliary oblique groove composed of a steeply-inclined part and a mildly-inclined part with respect to the tire axial direction and formed as a bent groove having a bent position, wherein the bent position is located on the same side of the tire equator as the bent position of the first auxiliary oblique groove, the connection point is located on the other side of the tire equator than the bent position of the second auxiliary oblique groove, the steeply-inclined part extends from the connection point to the bent position, while inclining to said one tire circumferential direction, and the mildly-inclined part extends from the bent position to the adjacent tread edge, while inclining to said one tire circumferential direction.

2. The motorcycle tire according to claim 1, wherein in each pattern unit, the first auxiliary oblique groove is substantially parallel with the second auxiliary oblique groove.

3. The motorcycle tire according to claim 1, wherein the distance L1 from the bent position of the first auxiliary oblique groove to the adjacent tread edge is more than the distance L2 from the bent position of the second auxiliary oblique groove to the adjacent tread edge.

4. The motorcycle tire according to claim 1, wherein each pattern unit comprises a first sub groove connecting between the first auxiliary oblique groove and the second auxiliary oblique groove, the depth of the first sub groove is smaller than the depth of the main oblique groove, and the first sub groove is inclined with respect to the tire axial direction to the same tire circumferential direction as the main oblique groove.

5. The motorcycle tire according to claim 1, wherein each pattern unit comprises a second sub groove connecting between the second auxiliary oblique groove and the circumferentially adjacent main oblique groove of the next pattern unit, the depth of the second sub groove is smaller than the depth of the main oblique groove, and the second sub groove is inclined with respect to the tire axial direction to the same tire circumferential direction as the main oblique groove.

6. The motorcycle tire according to claim 1, wherein each pattern unit comprises a first sub groove connecting between the first auxiliary oblique groove and the second auxiliary oblique groove, and a second sub groove connecting between the second auxiliary oblique groove and the circumferentially adjacent main oblique groove of the next pattern unit, the first sub groove and the second sub groove are inclined with respect to the tire axial direction to the same tire circumferential direction as the main oblique groove, and the depth of the first sub groove and the depth of the second sub groove are 40% to 60% of the depth of the main oblique groove.

7. The motorcycle tire according to claim 6, wherein the angle $\theta 1$ of the first sub groove with respect to the tire circumferential direction is more than the angle $\theta 2$ of the second sub groove with respect to the tire circumferential direction.

8. The motorcycle tire according to claim 2, wherein each pattern unit comprises a first sub groove connecting between the first auxiliary oblique groove and the second auxiliary oblique groove, the depth of the first sub groove is smaller than the depth of the main oblique groove, and the first sub groove is inclined with respect to the tire axial direction to the same tire circumferential direction as the main oblique groove.

9. The motorcycle tire according to claim 3, wherein each pattern unit comprises a first sub groove connecting between the first auxiliary oblique groove and the second auxiliary oblique groove, the depth of the first sub groove is smaller than the depth of the main oblique groove, and the first sub groove is inclined with respect to the tire axial direction to the same tire circumferential direction as the main oblique groove.

10. The motorcycle tire according to claim 2, wherein each pattern unit comprises a second sub groove connecting between the second auxiliary oblique groove and the circumferentially adjacent main oblique groove of the next pattern unit, the depth of the second sub groove is smaller than the depth of the main oblique groove, and the second sub groove is inclined with respect to the tire axial direction to the same tire circumferential direction as the main oblique groove.

11. The motorcycle tire according to claim 3, wherein each pattern unit comprises a second sub groove connecting between the second auxiliary oblique groove and the circumferentially adjacent main oblique groove of the next pattern unit, the depth of the second sub groove is smaller than the depth of the main oblique groove, and the second sub groove is inclined with respect to the tire axial direction to the same tire circumferential direction as the main oblique groove.

12. The motorcycle tire according to claim 2, wherein each pattern unit comprises a first sub groove connecting between the first auxiliary oblique groove and the second auxiliary oblique groove, and a second sub groove connecting between the second auxiliary oblique groove and the circumferentially adjacent main oblique groove of the next pattern unit, the first sub groove and the second sub groove are inclined with respect to the tire axial direction to the same tire circumferential direction as the main oblique groove, and the depth of the first sub groove and the depth of the second sub groove are 40% to 60% of the depth of the main oblique groove.

13. The motorcycle tire according to claim 3, wherein
each pattern unit comprises a first sub groove connecting between the first auxiliary oblique groove and the second auxiliary oblique groove, and a second sub groove connecting between the second auxiliary oblique groove and the circumferentially adjacent main oblique groove of the next pattern unit,
the first sub groove and the second sub groove are inclined with respect to the tire axial direction to the same tire circumferential direction as the main oblique groove, and
the depth of the first sub groove and the depth of the second sub groove are 40% to 60% of the depth of the main oblique groove.

\* \* \* \* \*